Sept. 23, 1947. C. A. POSSON 2,427,976
TAX WITHHOLDING CHART
Filed June 8, 1944 3 Sheets-Sheet 1

Sept. 23, 1947.                 C. A. POSSON                  2,427,976
                             TAX WITHHOLDING CHART
                              Filed June 8, 1944              3 Sheets-Sheet 2

Inventor:
Chester A. Posson
By Barnett & Truman
           Attorneys.

Sept. 23, 1947.  C. A. POSSON  2,427,976
TAX WITHHOLDING CHART
Filed June 8, 1944   3 Sheets-Sheet 3
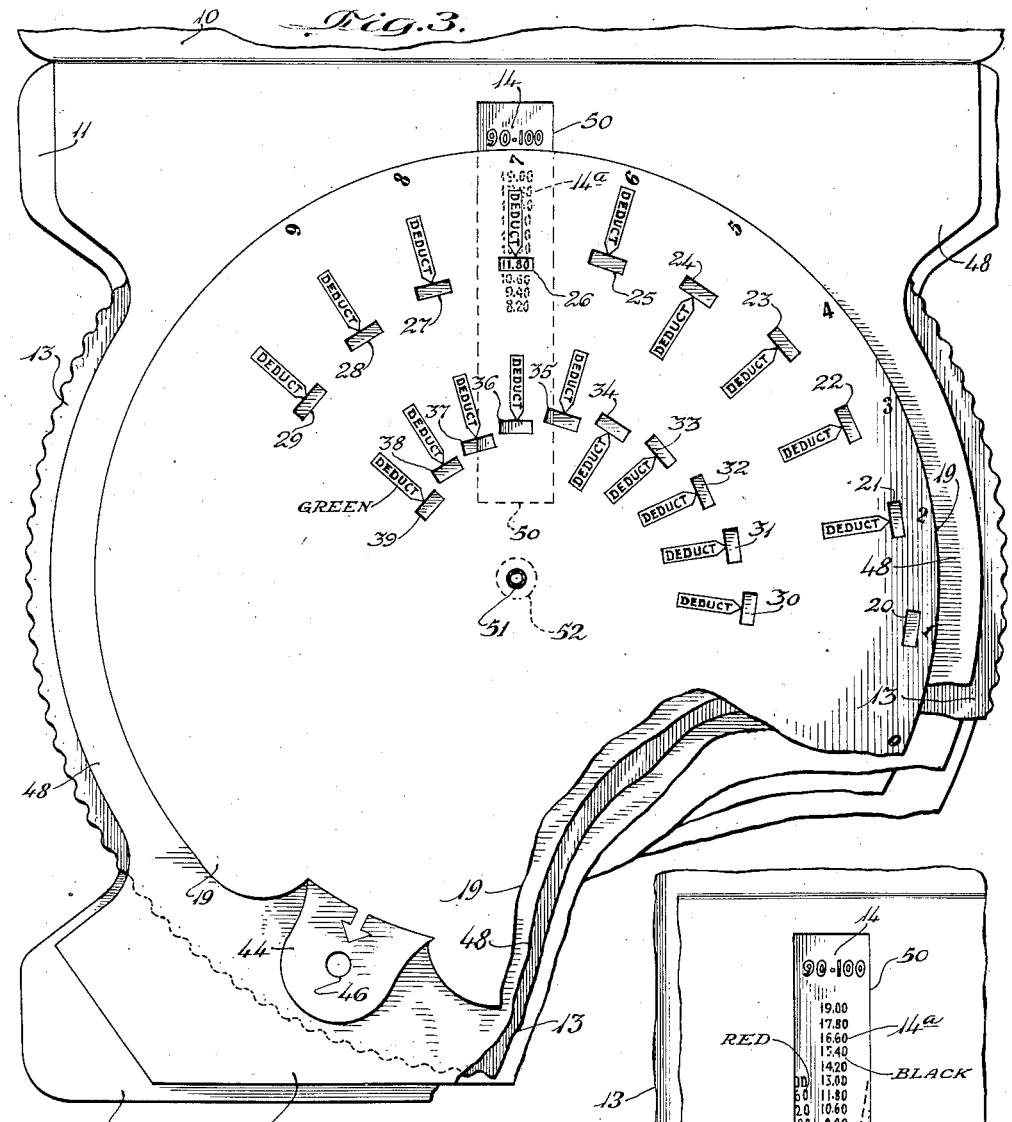

Patented Sept. 23, 1947

2,427,976

UNITED STATES PATENT OFFICE 2,427,976

TAX WITHHOLDING CHART

Chester A. Posson, Chicago, Ill.

Application June 8, 1944, Serial No. 539,343

5 Claims. (Cl. 235—88)

1

This invention relates to certain new and useful improvements in a device for selectively displaying any one of a plurality of computations based upon a combination of classification indexes, for example, the amount of money to be deducted as income tax from the earnings of an employee, having regard to the marital or family status of the employee, the number of dependents, and the amount of his earnings for a given period.

A principal object of the invention is to provide a simple and inexpensive device of the above character which, when manipulated according to simplified rules, will give accurate indications, according to approved deduction tables, of the amount of money which should be deducted from the earnings of an employee according to the combination of the several indexes which establish his particular tax classification.

While the invention is illustrated herein in connection with computations relative to the income tax to be withheld by an employer from the salary or wages of an employee, the principles of the invention are not limited to this specific situation. Obviously, the invention can be utilized in any situation where it is desirable to selectively display computations based upon two or more classification indexes.

The present invention may be briefly described as comprising one or more outside panels and two or more independently movable members, preferably revoluble disks, each of which are provided with one or more series of indexes which are cooperatively arranged with relation to window openings in one or the other of the rotatable disks and in the outer panel of the device so that when the rotatable disks are moved to position certain cooperative indexes in predetermined windows, a computation based upon the said cooperative indexes is displayed in another window formed in an outer panel of the device. The computations for the present device cover the income tax deductions to be made for various pay roll periods, for example, miscellaneous or daily wages, and weekly, biweekly, monthly and semimonthly earnings. These various pay roll periods may be varied to suit the particular situation. However, they are illustrated in the present embodiment of the invention merely to emphasize the advantages of the preferred form of device, whereby both front and back faces of one of the rotatable disks may be utilized for various indexes and computations and thereby minimize the thickness of the device and the number of its operating parts.

The invention is illustrated in certain preferred embodiments in the accompanying drawings wherein:

Fig. 3 is a view in elevation, partly broken away, illustrating the front face of another disk member arranged in its operative position in the device.

Fig. 4 is a fragmentary view of the device with the rotatable disk shown in Fig. 3, removed; and Fig. 5 is a sectional view taken on line 5—5 of Fig. 1, but showing the inner leaves and the outer panels of the device spaced apart in positions which may be assumed during the assembly of the device.

Figure 1:
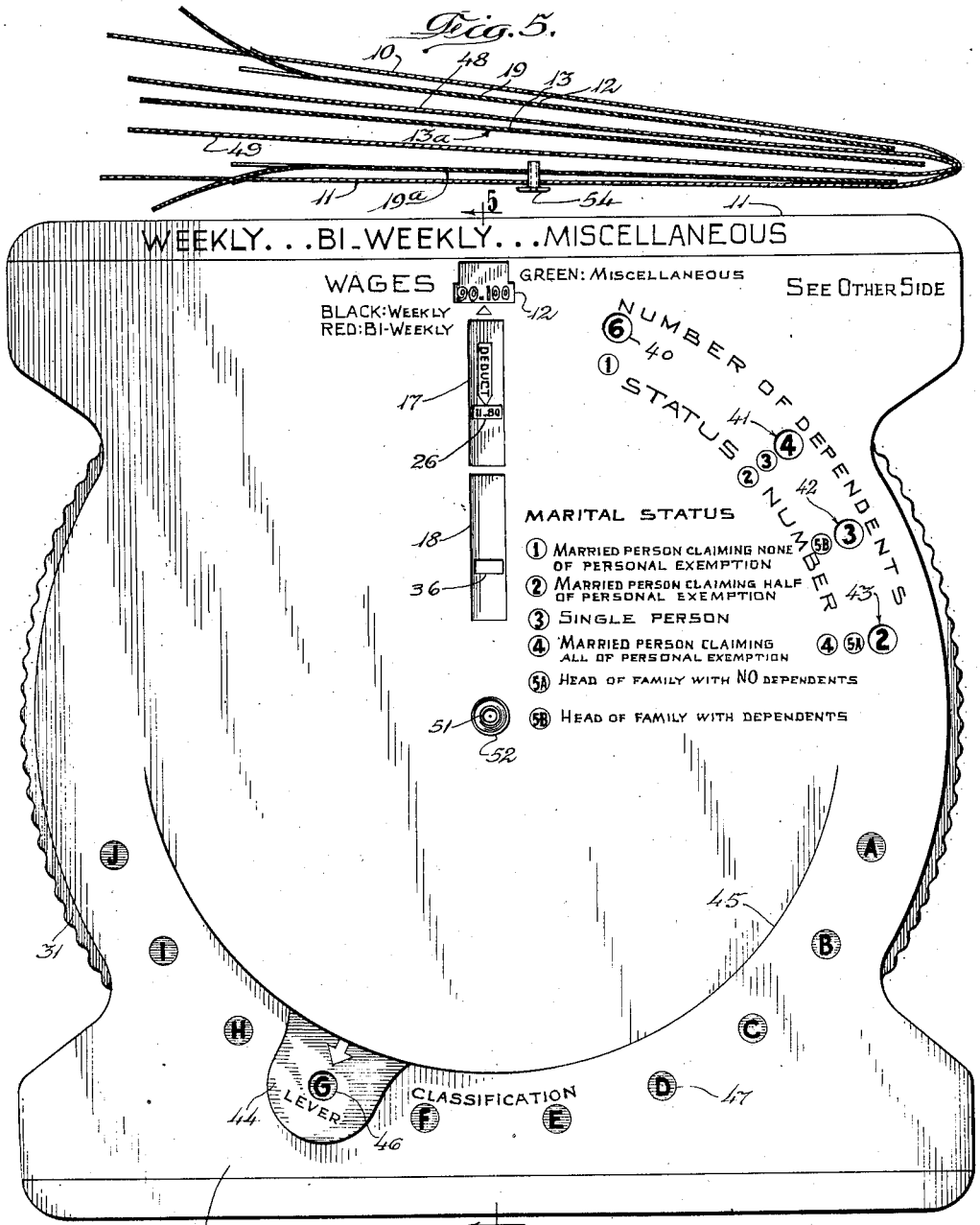
Fig. 1 is a face view of my improved computing device illustrating the various parts thereof arranged in one position.
Figure 2:
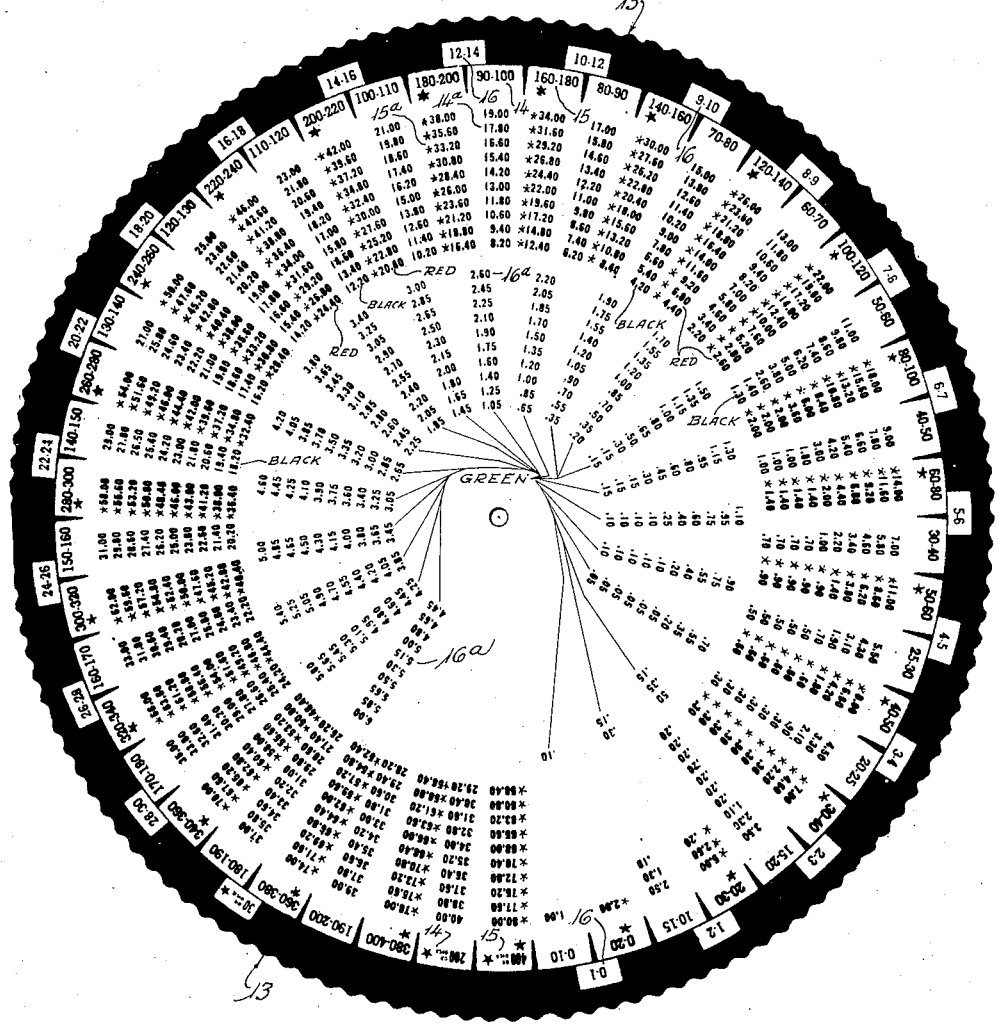
Fig. 2 is a view in elevation of the front face of one of the rotating disks embodied in the device shown.

Referring to the drawings, 10—11 designate the front and rear panels, respectively, of the device, the panels being formed preferably in a single piece which is folded upon itself along the upper edge so that in the final assembly of the device the said panels form an enclosing envelope for the rotatable disks. The front panel is provided with a window opening 12 in which indexes composed of the daily, weekly or biweekly earnings of an employee are shown. These earnings are printed in circular arrangement near the outer edge of rotatable disk 13. The weekly and biweekly earnings are positioned in alternate arrangement to form an inner circle, those for the weekly earnings being designated by the reference numeral 14, and those for the biweekly being printed in a distinctive manner, for example, in red ink or associated with an asterisk, and identified herein by the reference numeral 15. The indexes 14 and 15, it will be seen, assume positions near the bottom of window 12, whereas the indexes 16, for the miscellaneous or daily wages form an outer circle and appear in the upper position of window 12. These indexes are preferably printed in green ink or other distinctive color so as to clearly distinguish them at a glance from the earning indexes 14 and 15.

Associated with the indexes of earnings 14, 15 and 16, preferably in radial alignment therewith, are columns of computations designated 14ª, 15ª and 16ª, respectively. The said columns of computations are preferably printed in the same distinguishing type or color as is used for their associated earning indexes 14, 15 and 16. Each column contains ten computations showing the various amounts to be deducted from the employee's pay when said employee's earnings correspond to the earning index indicated and when such employee comes within any one of the ten tax classifications A to J, inclusive. These tax classifications are indicated by the letters A to J, inclusive, arranged in an arc on the outer panels of the device and are determined by the marital or family status of the employee and the number of dependents claimed by him. For example, if an employee is unmarried and has no dependents, he is within tax classification A. The amount to be deducted from his pay, as income tax, is, therefore, found as the first computation in the columns of computations. The particular column of computations to be used will be found in radial alignment with the earnings index of the employee. If he earns not less than $90.00 and not more than $100.00 per week and has no dependents, the amount to be deducted from his weekly pay is $19.00, as indicated by the first computation of column 14$^a$ arranged directly beneath the $90.00 to $100.00 earning index. If the same employee were paid biweekly, the amount to be deducted would be doubled (to-wit $38.00), as indicated in the adjacent biweekly column 15$^a$ arranged beneath the biweekly earnings index 15. If the employee is unmarried and is not the head of a family, but has six dependents, he is within the classification G and the amount to be deducted is $11.80, and is found as the seventh computation in said weekly column as shown in Figs. 1 to 4, inclusive, of the drawings. The same deduction should be made from the pay of employees having the same earning index but having different family status, for example, marital or family status 2 or 5 with four dependents, status 5$^B$ with three dependents, or status 4 or 5$^A$ with two dependents.

If the employee should be earning miscellaneous or daily wages of not less than $12.00 and not more than $14.00 the deduction should be $2.60, since this is the first computation in column 16$^a$ which is in radial alignment with the said earnigs index 12—14.

The said columns of computations 14 and 15 are arranged so that the separate columns may be brought into framed position within the elongated window opening 17 found in the front panel.

The columns of computations 16$^a$, covering this miscellaneous or daily pay, are so arranged that when any one of the earnings indexes 16 is framed within the window 12, the column of computations 16$^a$ associated with the displayed earnings index, will be positioned within the elongated window 18. However, only one of the computations of any one of the columns 14$^a$, 15$^a$ or 16$^a$ will be visible in the said windows 17 or 18. This result is obtained by reason of a classification disk 19 which is interposed between the disk 13 and the front panel 10 of the device. The classification disk 19 is provided with numerals 0 to 9 indicating the number of dependents and is provided also with a series of eccentrically arranged windows numbered 20 to 29, inclusive, so placed relative to the said numerals 0 to 9, indicating the dependents, and to the computations of columns 14$^a$ and 15$^a$ that the required deduction will be visible through one of the windows 20 to 29, inclusive, which assumes a position to frame the appropriate computation of the column positioned back of the elongated window 17. The other computations showing the deductions for employees of similar marital status, but having a different number of dependents, remain concealed back of disk 19.

When the earning index of the employee relates to miscellaneous or daily wages, the individual computations in columns 16$^a$ of disk 13 are made visible through a series of eccentrically arranged windows 30 to 39, inclusive.

The windows 20 to 29, inclusive, are arranged, as previously indicated, in definite positions relative to the numerals 0 to 9, indicating the dependents, and they are also arranged in predetermined positions relative to the classifications A to J, indicated on the front panel, and in predetermined position relative to a series of windows 40, 41, 42 and 43.

In order to simplify the operation of classification disk 19 and to facilitate positioning the disk to indicate the desired deduction to be made in relation to any selected combination of earnings index, marital status, and number of dependents, the disk 19 is formed with an operating lever 44 which extends through an arcuate slit 45 in the front panel. The said lever 44 is formed with a window opening 46 adapted to register with the spots 47 containing the classifications A to J, inclusive. Consequently, the number of dependents claimed by any employee having any one of the marital status indicated, as 1 to 5$^B$, can be made visible by moving the window 46 of operating lever 44 into register with the appropriate classification A to J.

The operation of the device to determine the amount of deduction may be described briefly as follows: Set the number of dependents in the window opposite the status number of the employee by moving the lever portion 44 of the disk 19 to the desired position to display the classification of an employee in the window 46 of the lever. This will position the numeral indicating the number of dependents in the appropriate window 40, 41, 42 or 43, as the classification requires, assuming, for purpose of illustration that the employee has the classification "G," the lever portion 44 is moved to that position so that a window 46 formed in the lever will frame the classification indicated. After the disk 19 is positioned, the disk 13 is moved to indicate the earnings index for the desired pay roll period. The amount to be deducted will then appear in the windows 17 or 18 of the device. If the employee has the classification "G" and earns not less than $90.00 and not more than $100.00 per week, the deduction from his pay should be $11.80, as indicated in Figs. 1 and 3 of the drawings.

The above description of the invention has been confined to the deductions which should be made when making up pay rolls of daily, weekly and biweekly pay rolls. In order to accommodate additional pay roll periods, the rear face of the disk 13, for example, the face designated 13$^a$ in Fig. 5, is provided with indexes and computations covering monthly and semimonthly payments. The arrangement of these computations corresponds to the indexes 14 and 15, and the computations in columns 14$^a$ and 15$^a$, as shown on the front face of the said disk. A second rotatable disk designated 19a is used in co-operation with the indexes and computations appearing on the rear face of disk 13. The said disk 19$^a$ is provided with the series of windows corresponding in position and arrangement to the windows 20 to 29, inclusive, shown in Fig. 3 and are adapted to expose only predetermined computations appearing on the rear face 13$^a$ of disk 13.

In order to prevent movement of disks 19, 19$^a$ from imparting movement to the disk 13, or vice versa, spacing leaves designated 48 and 49 are interposed between opposite faces of the disk 13 and the adjacent disks 19 and 19a. These spacing leaves are, of course, formed with openings 50 which register with the windows 12, 17 and 18 so as not to interfere with the showing of the desired deductions. The lower ends of the outer panels 10 and 11 and the spacing leaves 48 and 49 are secured together, for example, by adhesives or other suitable means so as to form a closed envelope for the disks 13, 19 and 19a. The periphery of disk 13 is provided with a scalloped edge which extends outwardly a short distance beyond the edge of the front and rear panels.

The pivotal axis for the disks may be any suitable form of attachment, for example rivet 51 and retaining ring 52.

While the invention herein is illustrated in connection with certain specific constructions of the various parts, it will be obvious to persons familiar with this art that these constructions may be changed to meet different conditions without departing from the spirit or intended purpose of the invention. It will be understood, therefore, that the invention includes all such changes in structure which come within the scope of the appended claims.

I claim:

1. A device for selectively displaying a plurality of indexes and a predetermined computation based upon values assigned to said indexes comprising a rotatable disk provided with certain of said indexes of different class values alternating in predetermined spaced relation and with inner and outer groups of computations and a front panel provided with separate but aligned windows through which computations from said inner and outer groups are made selectively visible, the said front panel being also provided with an arcuate slit and with a series of classification indexes arranged adjacent said slit, a second rotatable disk provided with a series of apertures arranged in predetermined position relative to the computations of said inner and outer groups, whereby movement of the second disk to a predetermined position relative to a selected classification index will display only one of the computations through one or the other of said windows, a combined pointer and operating lever on the second mentioned disk extending through said arcuate slit and cooperating with said classification indexes to determine the position of the said second disk relative to a selected classification index, means for clamping both disks in close relation to each other, and spacing means fixed relative to the front panel and positioned between the first and second mentioned disks to prevent movement of one from imparting movement to the other.

2. A device for selectively displaying one of a plurality of indexes and groups of predetermined computations based upon values assigned to said indexes, comprising a rotatable disk provided with certain of said indexes of different class values with the individual indexes of one class alternating with those of another class, and computations on opposite faces thereof and front and back panels provided with windows through which said indexes and computations are made selectively visible, each of the said panels being also provided with a series of classification indexes arranged in an arc at a predetermined distance from the center of said disk and an arcuate slit adjacent said classification indexes, and a pair of disks arranged on opposite sides of the first mentioned disk and each provided with a series of windows arranged in predetermined positions relative to the several computations on the adjacent side of the first mentioned disk whereby movement of either disk of said pair to a predetermined position relative to a selected classification index will display a predetermined computation through one of the windows of the adjacent outer panel, and a combined operating handle and classification pointer on each disk of said pair and projecting through the slit in the adjacent outer panel in cooperative relation with the classification indexes on said adjacent outer panel.

3. A device for displaying any one of a plurality of computations in accordance with a plurality of selected indexes, comprising, in combination, a front panel having a window therein for displaying an index from one of a plurality of class values and a window arranged in alignment therewith and having also a group of windows for displaying selected indexes of other class values, the said panel being also provided with an arcuate slit and with a series of classification indexes positioned adjacent said slit; a revoluble disk provided with a series of indexes of different class values arranged in a circle with the individual indexes of one class value alternating with those of another and adapted to be selectively positioned in the first mentioned window of the front panel and having also a series of computations for each index in said circle and adapted to be arranged opposite the second mentioned window when its associated index is displayed in the first mentioned window; a movable member provided with indicia related to said classification indexes adapted to be displayed in said group of windows when the said movable member is moved to predetermined positions defined by said classification indexes and the said movable member being interposed between said column of computations and the front panel and having a series of windows arranged therein at different distances from the center of the disk so that one computation only will be visible through said second window for any predetermined position of the movable member, said movable member being also provided with indicia related to certain of said classification indexes, which indicia is displayed in said group of windows when the movable member is moved to a predetermined position relative to a selected classification index, a combined pointer and operating handle carried by said movable member and extending through said arcuate slit in the front panel to facilitate shifting said movable member to various positions relative to selected classification indexes, means for clamping the disk and movable member in close relation to each other, and a spacing member interposed between said disk and said movable member to prevent movement of one from imparting movement to the other.

4. In apparatus for computing income tax to be withheld from the wages of employees, comprising, in combination, a front panel having a pair of windows formed therein in predetermined spaced relation and having also a group of windows therein bearing legends indicating the exemption status of the employee; a disk pivotally supported to turn about its central axis and having wage rate indexes for different payroll periods disposed thereon with the individual indexes of one period alternating with those of another and adapted to be selectively positioned in one window of said pair and the said disk having also a group of computations thereon for each of said wage rate indexes arranged in predetermined relation to an associated wage rate index so as to assume a position opposite the other window of said pair when its associated index is displayed in the first mentioned window of said pair; and a second disk interposed between the first disk and the first panel for movement about an axis coinciding with the axis of the first disk and having classification legends thereon adapted to be positioned in selected windows in said group and having also a series of windows arranged therein at different distances from the center and in predetermined relation to an associated classification legend so that one window only of said series of windows in the second disk may be positioned opposite the second window of said pair to display only one computation of the group associated with the displayed wage rate index.

5. In apparatus for computing income tax to be withheld from the wages of employees, comprising, in combination, a front panel having a pair of windows formed therein in predetermined spaced relation and having also a group of windows therein bearing legends indicating the exemption status of the employee; a disk pivotally supported to turn about its central axis and having wage rate indexes for different payroll periods disposed thereon with the individual indexes of one period alternating with those of another and adapted to be selectively positioned in one window of said pair and the said disk having also a group of computations thereon for each of said wage rate indexes arranged in predetermined relation to an associated wage rate index so as to assume a position opposite the other window of said pair when its associated index is displayed in the first mentioned window of said pair; a second disk interposed between the first disk and the first panel for movement about an axis coinciding with the axis of the first disk and having classification legends thereon adapted to be positioned in selected windows in said group and having also a series of windows arranged therein at different distances from the center and in predetermined relation to an associated classification legend so that one window only of said series of windows in the second disk may be positioned opposite the second window of said pair to display only one computation of the group associated with the displayed wage rate index; and means for operating the second disk comprising a lever connected therewith and extending through an arcuate slit formed in the front panel.

CHESTER A. POSSON.

REFERENCES CITED

The following references are of record in the file of this patent:

UNITED STATES PATENTS

| Number | Name | Date |
|---|---|---|
| 784,660 | Chritton | Mar. 14, 1905 |
| 896,002 | Free | Aug. 11, 1908 |
| 1,145,696 | Morgan | July 6, 1915 |
| 1,435,512 | Boggio | Nov. 14, 1922 |
| 1,453,100 | Fulgora | Apr. 24, 1923 |
| 1,492,026 | Fulgora | Apr. 29, 1924 |
| 1,801,225 | Craven | Apr. 14, 1931 |
| 804,646 | Young | Nov. 14, 1905 |
| 1,076,929 | Williamson | Oct. 28, 1913 |
| 2,385,732 | Redding | Sept. 25, 1945 |

FOREIGN PATENTS

| Number | Country | Date |
|---|---|---|
| 2,848 | Great Britain | 1874 |